United States Patent
Yoshida et al.

(10) Patent No.: US 11,643,365 B2
(45) Date of Patent: May 9, 2023

(54) SOLID ELECTROLYTE, PRODUCING METHOD THEREOF, AND GAS SENSOR

(71) Applicant: DENSO CORPORATION, Kariya (JP)

(72) Inventors: Mitsuhiro Yoshida, Kariya (JP); Satoshi Suzuki, Kariya (JP); Makoto Noguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 284 days.

(21) Appl. No.: 16/864,268

(22) Filed: May 1, 2020

(65) Prior Publication Data

US 2020/0255340 A1     Aug. 13, 2020

Related U.S. Application Data

(63) Continuation of application No. PCT/JP2018/038081, filed on Oct. 12, 2018.

(30) Foreign Application Priority Data

Nov. 3, 2017  (JP) .............. JP2017-213347

(51) Int. Cl.
*H01M 4/02* (2006.01)
*C04B 35/486* (2006.01)
*C04B 35/626* (2006.01)
*C04B 35/64* (2006.01)
*G01N 27/407* (2006.01)

(52) U.S. Cl.
CPC ...... *C04B 35/486* (2013.01); *C04B 35/62645* (2013.01); *C04B 35/62695* (2013.01); *C04B 35/64* (2013.01); *G01N 27/4073* (2013.01); *C04B 2235/3246* (2013.01); *C04B 2235/785* (2013.01); *C04B 2235/786* (2013.01)

(58) Field of Classification Search
CPC ...................................................... H01M 4/02
See application file for complete search history.

(56) References Cited

U.S. PATENT DOCUMENTS

| | | |
|---|---|---|
| 4,370,393 A | 1/1983 | Watanabe et al. |
| 5,419,827 A | 5/1995 | Nanataki et al. |
| 2017/0143458 A1 | 5/2017 | Fujisaki et al. |

FOREIGN PATENT DOCUMENTS

| | | |
|---|---|---|
| EP | 0 942 279 A2 | 9/1999 |
| JP | 60-155568 | 8/1985 |
| JP | 3-64468 | 10/1991 |
| JP | H07-088251 | 9/1995 |
| JP | H09-124365 | 5/1997 |
| JP | 2000-292406 | 10/2000 |
| JP | 2005-082429 | 3/2005 |
| JP | 3873302 | 11/2006 |
| JP | 2011-242145 | 12/2011 |
| JP | 2013-101907 | * 5/2013 |
| WO | 2022/254989 | 12/2022 |

* cited by examiner

*Primary Examiner* — Jacob B Marks
(74) *Attorney, Agent, or Firm* — Nixon & Vanderhye P.C.

(57) ABSTRACT

The invention relates to a solid electrolyte including partially stabilized zirconia, a producing method thereof, and a gas sensor including a solid electrolyte. The partially stabilized zirconia includes crystal particles, the crystal particles include mixed phase particles each having a high-concentration phase and a low-concentration phase, the high-concentration phase being defined such that a concentration of the stabilizer is 4.7 mol % or more, the low-concentration phase being defined as a concentration of the stabilizer is less than 4.7 mol %.

7 Claims, 8 Drawing Sheets

SOLID ELECTROLYTE, PRODUCING METHOD THEREOF, AND GAS SENSOR

CROSS-REFERENCE TO RELATED APPLICATION

The present application is a continuation application of International Application No. PCT/JP2018/038081, filed on Oct. 12, 2018, which claims priority to Japanese Patent Application No. 2017-213347, filed on Nov. 3, 2017. The contents of these applications are incorporated herein by reference in their entirety.

BACKGROUND

Technical Field

The present disclosure relates to a solid electrolyte made of partially stabilized zirconia, a production method thereof, and a gas sensor including a solid electrolyte.

Background Art

A gas sensor element is used in an exhaust system of an internal combustion engine and the like for the purpose of detecting oxygen concentration, air-fuel ratio, etc. in an exhaust gas. In such a gas sensor element, an oxide ion conductive solid electrolyte such as zirconia is used.

For example, the prior art discloses a ceramic laminate provided with a solid electrolyte layer made of zirconia in which a stabilizer is in a solid solution. Such a ceramic laminate is used in a gas sensor and the like.

SUMMARY

In the present disclosure, provided is a solid electrolyte as the following. The solid electrolyte includes a partially stabilized zirconia; the mixed phase particles contain 15 volume percent or more of a total of the low-concentration phases in the partially stabilized zirconia; the mixed phase particles include adequate low-concentration mixed particles each containing 80 volume percent or less of the corresponding low-concentration phase; a presence rate of the adequate low-concentration mixed particles to all the mixed phase particles is set to 90 volume percent or more; and the average particle size of the mixed phase particles is from 0.3 to 1.5 μm.

BRIEF DESCRIPTION OF THE DRAWINGS

The above object and other objects, features and advantages of the present disclosure shall become more evident by the following detailed description with reference to the accompanying drawings. In the drawings.

DETAILED DESCRIPTION OF THE PREFERRED EMBODIMENTS

PTL 1: JP 2000-292406 A

In recent years, strict fuel consumption and emission control are required for vehicles, and, for example, on-board gas sensors are sought to be more reliable under a further higher temperature environment by changing the mounting position thereof and the like. On the other hand, as a measure against frequent engine stops due to popularization of hybrid vehicles, idle stop vehicles and the like, maintenance of a low temperature by ON/OFF switching of a heater in a gas sensor when a vehicle comes to a halt is being sought from the perspective of reducing power consumption. Therefore, high reliability of gas sensors having to bear increased load of cooling and heating cycles is being sought.

However, a conventional solid electrolyte made of partially stabilized zirconia does not have enough strength against cooling and heating cycles. This is because an unstable monoclinic phase is present at the crystal grain boundary of a stable cubic phase. That is, in a crystal grain boundary of the cubic phase, volume change occurs due to phase transformation of the monoclinic phase, and internal stress is generated. Therefore, a conventional solid electrolyte has insufficient strength after being exposed to cooling and heating cycles, and improvements are being sought.

An object of the present disclosure is to provide a solid electrolyte having excellent strength to cooling and heating cycles, a production method thereof, and a gas sensor using the solid electrolyte.

One embodiment of the present disclosure is a solid electrolyte including partially stabilized zirconia that is comprised of zirconia and a stabilizer being in a solid solution in the zirconia, where the partially stabilized zirconia includes crystal particles, the crystal particles include mixed phase particles each having a high-concentration phase and a low-concentration phase, the high-concentration phase is defined such that a concentration of the stabilizer is 4.7 mol % or more, the low-concentration phase is defined as a concentration of the stabilizer is less than 4.7 mol %;

the mixed phase particles contain 15 volume percent or more of a total of the low-concentration phases in the partially stabilized zirconia;

the mixed phase particles include adequate low-concentration mixed particles each containing 80 volume percent or less of the corresponding low-concentration phase;

a presence rate of the adequate low-concentration mixed particles to all the mixed phase particles is set to 90 volume percent or more; and the average particle size of the mixed phase particles is from 0.3 to 1.5 μm.

Another embodiment of the present disclosure is a gas sensor including a solid electrolyte.

Still another embodiment of the present disclosure is a method of producing a solid electrolyte including:

a heat treating step of mixing and heat treating a first raw material powder comprised of zirconia particles and a stabilizer raw material powder comprised of stabilizer particles to thereby prepare a mixed raw material comprised of bonded particles, each of the bonded particles being comprised of at least one of the zirconia particles and at least one of the stabilizer particles that are bonded to each other;

a mixing step of mixing the mixed raw material, and a second raw material powder comprised of zirconia particles to thereby obtain a mixture;

a shaping step of shaping the mixture into a predetermined shaped body; and a firing step of firing the predetermined shaped body to obtain a solid electrolyte comprised of partially stabilized zirconia.

The solid electrolyte includes partially stabilized zirconia and concurrently includes mixed phase particles each having a high-concentration phase with a relatively large amount of a stabilizer and a low-concentration phase with a relatively small amount of a stabilizer in one crystal particle. The high-concentration phase can be treated thermodynamically as a stable cubic phase, and the low-concentration phase can be treated thermodynamically as an unstable monoclinic phase or a tetragonal phase. In the following descriptions, the cubic phase is appropriately referred to as a "C phase", the monoclinic phase is appropriately referred to as an "M phase", and the tetragonal phase is appropriately referred to as a "T phase".

In the mixed phase particles, even if a phase transformation occurs in the low-concentration phase due to a temperature change leading to a volume change, the volume change is absorbed by the high-concentration phase present in the same crystal particle. Therefore, even if the solid electrolyte comprised of partially stabilized zirconia is exposed to cooling and heating cycles, the internal stress accompanying the volume change is mitigated. Therefore, the solid electrolyte exhibits excellent strength against the cooling and heating cycles. For example, the solid electrolyte exhibits excellent strength against the cooling and heating cycles when heated to a high temperature region exceeding 1,000° C.

As mentioned above, the gas sensor includes a solid electrolyte exhibiting excellent strength against cooling and heating cycles. As such, even if the gas sensor is exposed to cooling and heating cycles heated to a high temperature region exceeding 1,000° C., internal damage is unlikely to occur. Therefore, the gas sensor exhibits high reliability that can withstand a high temperature environment exceeding, for example, 1,000° C.

The production method includes a heat treatment step, a mixing step, a shaping step, and a firing step. In the heat treatment step, heat treatment is performed by mixing the first raw material powder and the stabilizer raw material powder. By the heat treatment, the zirconia particles and the stabilizer particles are bonded. As a result, a mixed raw material comprised of bonded particles of zirconia particles and stabilizer particles is obtained.

In the mixing step, the mixed raw material and the second raw material powder are mixed to obtain a mixture. Next, a shaping step and a firing step are performed. In the firing step, mixed phase particles each having the high-concentration phase and the low-concentration phase in one crystal particle are generated as crystal particles by the presence of the bonded particles. Therefore, according to the production method, the solid electrolyte of the constitution mentioned above can be obtained.

As such, according to the embodiment mentioned above, it is possible to provide a solid electrolyte having excellent strength against cooling and heating cycles, a producing method thereof, and a gas sensor using the solid electrolyte.

Further, signs in parentheses described in the claims show correspondence relations with the specific means as described in embodiments to be described later, and do not limit the technical scope of the present disclosure.

First Embodiment

Figure 1:
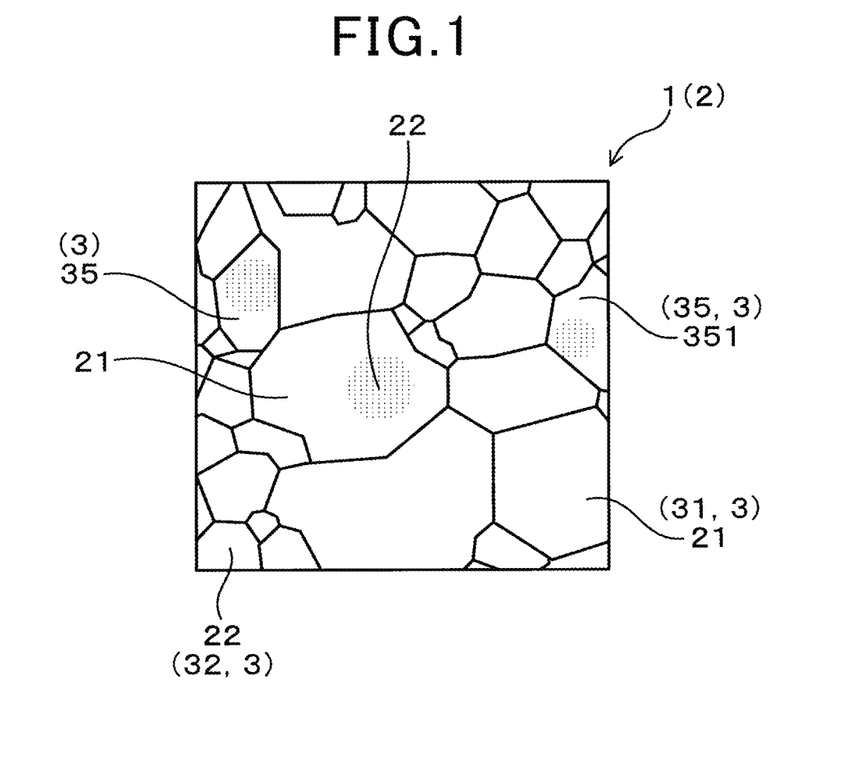
FIG. 1 is a schematic view showing a microstructure of partially stabilized zirconia constituting a solid electrolyte in Embodiment 1.

An embodiment relating to a solid electrolyte shall be described with reference to FIG. 1 to FIG. 4. As illustrated in FIG. 1, a solid electrolyte 1 is comprised of partially stabilized zirconia 2. The partially stabilized zirconia 2 is a so-called sintered compact. The partially stabilized zirconia 2 is a sintered compact in which a stabilizer is in a solid solution in the zirconia.

Examples of the stabilizer include yttria, calcia, magnesia, scandia, ytterbia and the like. The partially stabilized zirconia can include at least one of these as a stabilizer.

In the partially stabilized zirconia 2, there are a high-concentration phase 21 and a low-concentration phase 22 as crystal phases constituting the partially stabilized zirconia 2. The high-concentration phase 21 is a crystal phase in which the concentration of a stabilizer in the phase is 4.7 mol % or more. On the other hand, the low-concentration phase 22 is a crystal phase in which the concentration of a stabilizer in the phase is less than 4.7 mol %. As such, in the present disclosure, the crystal phase is prescribed based on the concentration of the stabilizer. On the other hand, based on common technical knowledge, the partially stabilized zirconia 2 can be understood to have a C phase, an M phase, and a T phase. That is, from the perspective of a crystal system, the partially stabilized zirconia 2 can also be understood to have C phase particles, M phase particles, and T phase particles as crystal particles. Meanwhile, it is considered that the high-concentration phase is substantially the C phase and the low-concentration phase is substantially the M phase or the T phase. By scanning electron microscope/energy dispersive X-ray spectroscopy (that is, SEM/EDX analysis) to be described later, for example, to measure the concentration of a metal element such as Y in the stabilizer, and to thereby perform measurement of the concentration. Meanwhile, it is common technical knowledge that the C phase, M phase, and T phase are determined by X-ray diffraction analysis. In FIG. 1, the existing regions of the M phase or the T phase in which the concentration of the stabilizer is less than 4.7 mol % are indicated by dotted regions.

The partially stabilized zirconia 2 includes a large number of crystal particles 3. The crystal particles 3 include the mixed phase particles 35 each having the high-concentration phase 21 and the low-concentration phase 22.

As illustrated in FIG. 1, the mixed phase particles 35 preferably are particles each having the low-concentration phase 22 and the high-concentration phase 21 surrounding the low-concentration phase 22. In this case, even if a volume change occurs in the low-concentration phase 22 by the cooling and heating cycles, the high-concentration phase 21 surrounding the periphery absorbs the volume change. Therefore, strength against thermal cycles further improves.

The partially stabilized zirconia 2 includes crystal particles 3 that do not constitute the mixed phase particles 35. That is, the partially stabilized zirconia 2 includes crystal particles (that is, high-concentration phase particles 31) comprised of the high-concentration phases 21, and further includes crystal particles (that is, low-concentration phase particles 32) comprised of the low-concentration phases 22.

It is preferable that 15 volume percent (15% by volume) or more of a total of the low-concentration phases 22 present in the partially stabilized zirconia 2 are present in the mixed phase particles 35. That is, it is preferable that 15 volume percent or more of all the low-concentration phases 22 be present in the mixed phase particles 35. In this case, the initial strength of the solid electrolyte 1 improves. It is considered that this is because the volume change caused by the transformation of the low-concentration phases 22 during firing is mitigated by the mixed phase particles 35 and the internal stress of the solid electrolyte is reduced.

The partially stabilized zirconia 2 includes, as The mixed phase particles 35 include adequate low-concentration mixed particles 351 each containing 80 volume percent or less of the corresponding low-concentration phase, and the presence rate of adequate low-concentration mixed particles 351 to all the mixed phase particles 35 is preferably set to 90 volume percent or more. In this case, the initial strength of the solid electrolyte 1 improves. Furthermore, the strength retaining property to thermal cycles becomes favorable.

The adequate low-concentration mixed particles 351 refers to the mixed phase particles 35 in which the content of the low-concentration phases in the particles is 80 volume percent or less. The determination of the adequate low-concentration mixed particles 351 is performed by SEM/EDX analysis to be described later.

Figure 2:
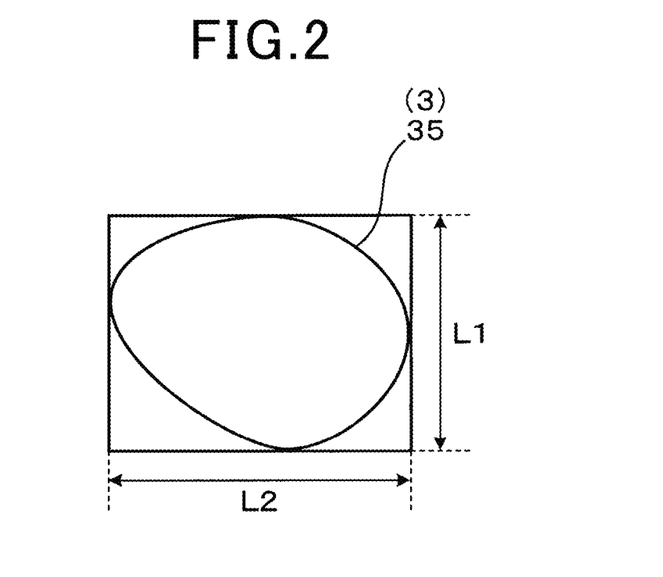
FIG. 2 is an explanatory view showing particle size of a crystal particle in Embodiment 1.

The average particle size of the mixed phase particles 35 is preferably 0.3 to 1.5 μm. In this case, the generation of the mixed phase particles 35 is facilitated, and the effect of improving strength by the mixed phase particles 35 is further enhanced. As illustrated in FIG. 2, the particle size of the mixed phase particles 35 is expressed by an arithmetic mean of length L1 in the horizontal direction and length L2 in the vertical direction of a rectangle surrounded by the maximum widths of the mixed phase particles 35 in the horizontal direction and the vertical direction. The average particle size of the mixed phase particles 35 is expressed by an arithmetic mean of the particle size of 50 mixed phase particles 35. Further, the particle size of other crystal particles, particle size and average particle size of low-concentration phases in the mixed phase particles can be calculated based on this method.

From the perspective of obtaining the effects of the present disclosure, the type of a stabilizer is not particularly limited, but from the perspective of improving the chemical stability of the stabilizer, the stabilizer is preferably comprised of yttria.

Figure 3:
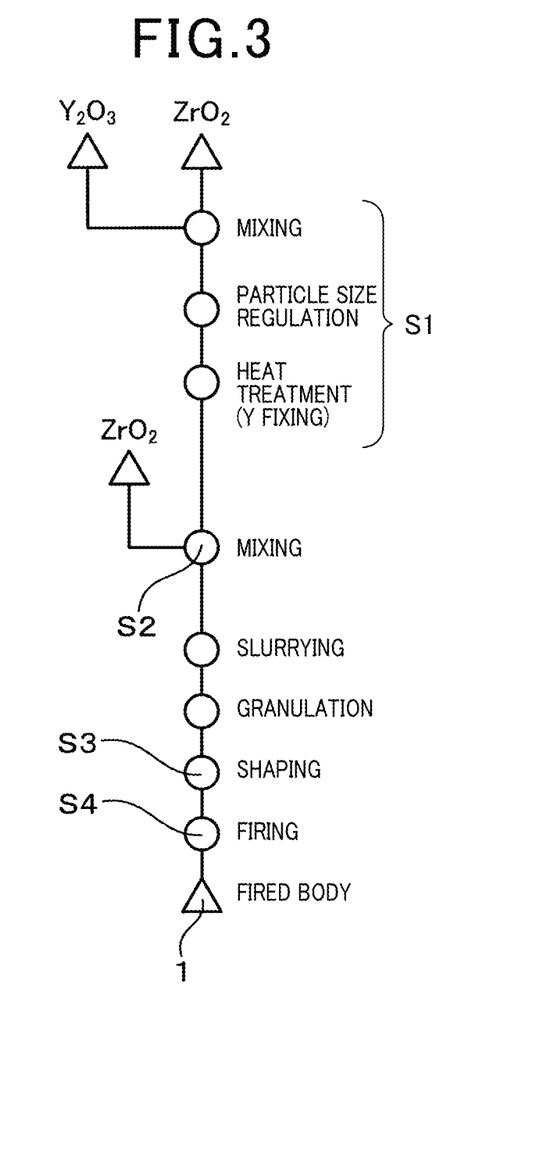
FIG. 3 is an explanatory view showing a production method of the solid electrolyte in Embodiment 1.
Figure 4:
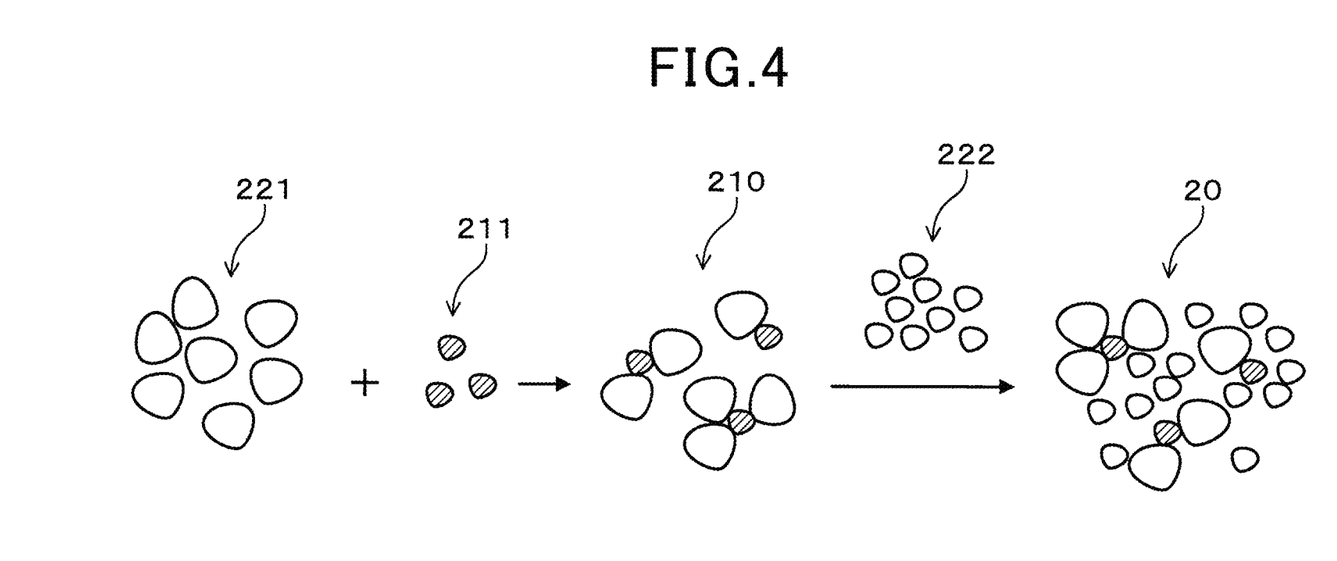
FIG. 4 is an explanatory view schematically showing a heat treatment step and a mixing step in the production method in Embodiment 1.

Next, a production method of the solid electrolyte 1 is described. As illustrated in FIG. 3 and FIG. 4, the solid electrolyte 1 is obtained by performing the heat treatment step S1, the mixing step S2, the shaping step S3, and the firing step S4.

In the heat treatment step S1, heat treatment is performed by mixing a first raw material powder 221 and a stabilizer raw material powder 211. The first raw material powder 221 is comprised of zirconia particles, and the stabilizer raw material powder 211 is comprised of stabilizer particles. By the heat treatment, a mixed raw material 210 comprised of bonded particles is obtained, each of the bonded particles being comprised of at least one of the zirconia particles and at least one of the stabilizer particles that are bonded to each other. In each of the bonded particles, at least one of the zirconia particles and at least one of the stabilizer are fixed to each other.

In the heat treatment step, particle size regulation (i.e. sizing) can be performed after mixing the first raw material powder 221 and the stabilizer raw material powder 211. Thereby, the particle size of the bonded particles obtained after the heat treatment can be adjusted. The heat treatment is performed by heating. The heating temperature is set in the range of, for example, from 500 to 1,000° C.

In the mixing step S2, the mixed raw material 210 and a second raw material powder 222 comprised of zirconia particles are mixed. Thereby, a mixture 20 is obtained.

The first raw material powder 221 is preferably comprised of zirconia particles having a larger average particle size than an average particle size of the zirconia particles of the second raw material powder 222. In this case, the particle size of the zirconia particles in the bonded particles is large, and therefore it is possible to generate a region in which the stabilizer is not in a solid solution inside the zirconia particles in the firing step. That is, formation of a phase having a low stabilizer concentration (that is, a low-concentration phase) is facilitated. This is because the stabilizer usually is solid-dissolved from the surface to the inside of the zirconia particles. As a result, generation of the mixed phase particles 35 is facilitated. When the mixed phase particles 35 are generated, it is considered that a high-concentration phase comprised of, for example, a C phase is formed around a low-concentration phase comprised of, for example, an M phase or a T phase while lattice matching with the low-concentration phase.

The average particle size of the first raw material powder is preferably in the range of from 0.6 to 1.0 μm, and the average particle size of the second raw material powder is preferably in the range of from 0.2 to 0.5 μm. In this case, the mixed phase particles 35 are more easily generated. From a similar perspective, the average particle size of the first raw material powder is preferably larger than the average particle size of the second raw material powder by 0.2 μm or more, more preferably by 0.3 μm or more, and even more preferably by 0.4 μm or more.

The average particle size of the first raw material powder and the second raw material powder means particle size at a volume integration of 50% in a particle size distribution obtained by a laser diffraction/scattering method. The particle size at a volume integration of 50% in the particle size distribution obtained by the laser diffraction/scattering method is appropriately referred to as a "d50 particle size".

The stabilizer raw material powder is comprised of a stabilizer such as a yttria.

Examples of the stabilizer raw material powder used include, yttria powder, calcia powder, magnesia powder, scandia powder, ytterbia powder and the like. At least one of them can be used as the stabilizer raw material powder.

The mixture 20 can be slurried prior to shaping. Liquids such as water, alcohol, and liquid organic substances can be used for slurrying. The slurried mixture may be granulated.

Next, the shaping process is performed. In the shaping step, the mixture 20 is molded. Thereby, a predetermined shaped body is obtained. The shaping method is not particularly limited, and examples thereof include powder compacting molding, pressure forming, extrusion molding, injection molding, hot pressing, cold isotropic pressurizing forming, and grinding. By shaping, a predetermined shaped body having a desired shape can be obtained depending on use. For example, predetermined shaped bodies having various shapes such as a plate shape, a sheet shape, a hollow sheet shape, a rod shape, a cylindrical shape, and a bottomed cylindrical shape can be obtained. Grinding can be performed on the predetermined shaped body depending on requirements.

Next, in the firing step, the predetermined shaped body is fired. By the firing, the partially stabilized zirconia 2 is generated, and the solid electrolyte 1 is obtained. The firing temperature can be appropriately changed depending on the composition and the like, but it is, for example, from 1,300 to 1,500° C.

In the production method, a mixed raw material comprised of bonded particles obtained in the heat treatment step is obtained. Thereby, the mixed phase particles 35 mentioned above are generated in the firing step. As such, the solid electrolyte 1 of the present embodiment can be obtained.

The solid electrolyte 1 of the present embodiment is comprised of the partially stabilized zirconia 2, and concurrently includes the mixed phase particles 35 each having the high-concentration phase 21 and the low-concentration phase 22. The high-concentration phase 21 has a relatively high-concentration of the stabilizer, i.e., the concentration of the stabilizer being at a predetermined value or higher, and the low-concentration phase 22 has a relatively low-concentration of the stabilizer, i.e., the concentration of the stabilizer being at less than a predetermined value.

In the mixed phase particles 35, even if a phase transformation occurs in the low-concentration phase 22 due to a temperature change and thereby a volume change such as volume expansion occurs, the volume change is absorbed by the high-concentration phase 21 present in the same crystal particle. Therefore, even if the solid electrolyte 1 is exposed to cooling and heating cycles, the internal stress accompanying the volume change is mitigated. Therefore, the solid electrolyte 1 exhibits excellent strength against cooling and heating cycles when heated up to a high temperature region, for example, exceeding 1,000° C. Although the use of the solid electrolyte 1 is not particularly limited, it is used, for example, in a gas sensor. Such solid electrolyte 1 has a gas contact portion 1A configured to come into contact with a measurement gas such as exhaust gas (see FIG. 9 and FIG. 10 to be described later).

Comparative Embodiment 1

Next, a solid electrolyte of a comparative embodiment shall be described. The solid electrolyte is produced in the same method as that of Embodiment 1, except that the heat treatment step is not performed, and that one type of zirconia raw material powder is used instead of the first raw material powder and the second raw material powder.

Specifically, a zirconia raw material powder comprised of zirconia particles and a stabilizer raw material powder are mixed. Next, the mixture is slurried, and then molded and fired. As such, a solid electrolyte 9 of the present embodiment can be obtained.

Figure 5:
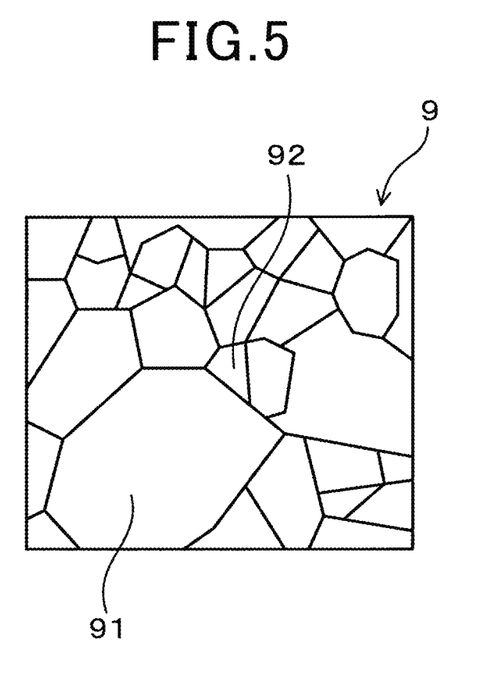
FIG. 5 is a schematic view showing a microstructure of partially stabilized zirconia constituting a solid electrolyte in Comparative Embodiment 1.

As illustrated in FIG. 5, partially stabilized zirconia 90 constituting the solid electrolyte 9 of the present embodiment includes C phase particles 91, M phase particles 92 and the like as the crystal particles 3.

In this embodiment, production of bonded particles is not performed in the heat treatment step. Therefore, reactivity between zirconia and the stabilizer is high. As a result, although the drawing of the solid solution state is omitted, the stabilizer is in a solid solution not only inside the C phase particles 91 but also inside the M phase particles 92. This can be confirmed by SEM/EDX analysis. The solid electrolyte 9 of the present embodiment does not have mixed phase particles as in the first embodiment. Therefore, the solid electrolyte 9 has insufficient strength against the cooling and heating cycles.

This is because the M phase particles 92 (or the T-phase particles) present in the grain boundaries of the C phase particles 91 undergo a volume change due to phase transformation. Due to the volume change, internal stress is generated in the solid electrolyte 9, and as a result, the strength against the cooling and heating cycles is reduced. Therefore, when the solid electrolyte 9 is exposed to cooling and heating cycles reaching a high temperature region, for example exceeding 1,000° C., the solid electrolyte 9 is likely to suffer breakage.

Experimental Example 1

A plurality of solid electrolytes according to examples and comparative examples are prepared, and their performances are compared and evaluated. A method of producing the solid electrolyte in the present example shall be hereinafter described.

First, yttria powder, and zirconia powder having a d50 particle size of 0.70 μm were mixed and particle size regulation was performed. Next, heat treatment was performed to obtain a mixed raw material comprised of bonded particles in which yttria particles and zirconia particles were bonded.

Moreover, zirconia powder having a d50 particle size of 0.30 μm was mixed into the mixed raw material. The zirconia powder having a d50 particle size of 0.70 μm corresponds to the first raw material powder, and the zirconia powder having a d50 particle size of 0.30 μm corresponds to the second raw material powder. Yttria powder corresponds to the stabilizer raw material powder mentioned above. These mixing ratios can be adjusted according to the target composition.

Next, a mixture of zirconia powder, yttria powder and agglomerated zirconia powder was mixed with water to obtain a slurry of the mixture. In order to increase the fluidity of each raw material particles constituting the mixture and to facilitate shaping into a desired shape, the slurry of the mixture was granulated. Granulation was performed, for example, by spray granulation.

Next, the mixture was molded to obtain a predetermined shaped body. Shaping was performed, for example, by powder compacting molding. In the present example, the mixture was molded into a sample shape to be used in each evaluation to be described later.

Next, the predetermined shaped body was fired at a temperature of 1,400° C. The solid electrolyte 1 was thereby obtained. In the present example, the solid electrolytes 1 of Samples 1 to 15 shown in Table 1 was produced by changing the average particle size, the blending ratio and the like of each raw material.

(Presence or Absence of Mixed Phase Particles)

A measurement sample having a width of 5 mm, a length of 20 mm, and a thickness of 2 mm was cut out from each sample. After polishing the surface of this measurement sample, a thermal etching process was performed thereon. The thermal etching was performed by heating the measurement sample at a temperature of 1,200° C. for 1 hour. By composition analysis by SEM/EDX analysis, Y element mapping was performed on five regions in the measurement sample and observations were made. Among the observed crystal phases, particles having a Y concentration of 4.7 μm or more were determined as high-concentration phases, and particles having a Y concentration of less than 4.7 µm were determined as low-concentration phases. Further, in the SEM/EDX analysis, the M phase and the T phase cannot be differentiated, but the high-concentration phase and the low-concentration phase can be differentiated by the Y concentration, and therefore determination of the mixed phase particles can be sufficiently performed. The SEM observation conditions were as follows: Device: "SU8220" manufactured by Hitachi High-Technologies Corporation; Accelerating voltage: 5 kV; WD setting: 8.0 mm; Electric current: 10 mA; and Magnification: 20,000 times. Moreover, EDX measuring conditions were as follows. Device: "Xflash 6160" manufactured by Bruker Corporation; Accelerating voltage: 5 kV; Electric current: 5-15 mA; and Magnification: 50,000 times. The electric current was adjusted so that the detection amount was from 40 to 55 kcps.

Figure 6A:
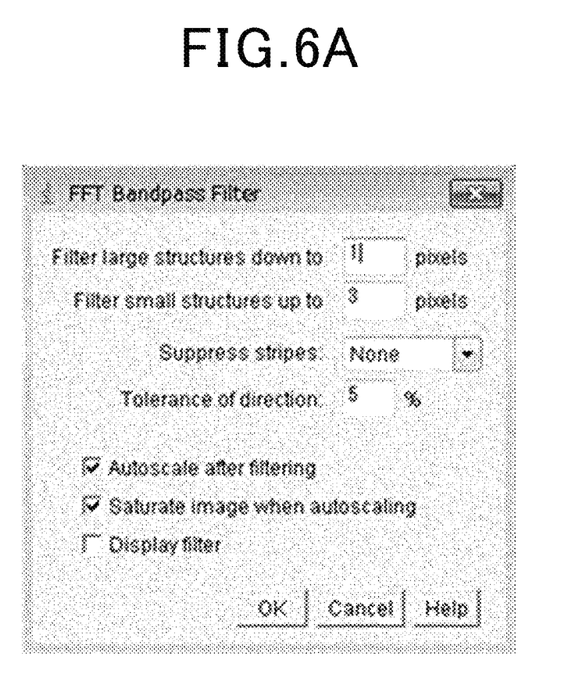
FIG. 6A is a chart showing setting conditions of FFT Bandpass Filter processing.
Figure 6B:
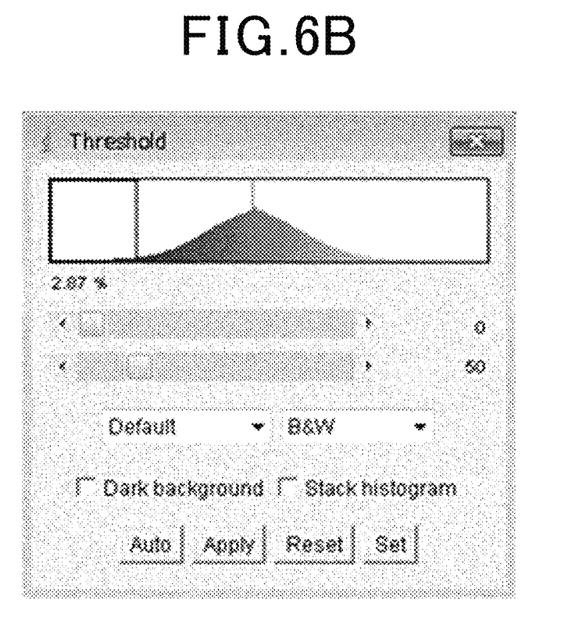
FIG. 6B is a chart showing setting conditions of Threshold processing, in the binarization processing of the Experimental Example.

Next, regarding the SEM image in the same region as that of the SEM/EDX analysis mentioned above, the crystal particles and the grain boundaries of each crystal particle were separated by a binarization processing. The binarization processing was performed using "ImageJ 1.50i" software. In the binarization processing, an FFT Bandpass Filter processing, Sharpen processing, Threshold processing, and Noise Despeckle processing are sequentially performed. Processing conditions were as follows. As shown in FIG. 6A, the conditions for the FFT Bandpass Filter processing were, Filter large structures down to 1 pixels, Filter small structures up to 3 pixels, Suppress stripes: None, Tolerance of direction: 5%, Autoscale after filtering: ON, Saturate image when autoscaling: ON, and Display filter: OFF. Conditions for the Threshold processing are as shown in FIG. 6B.

The mixed phase particles were determined by comparing the SEM image after the binarization processing with the Y mapping image by the SEM/EDX analysis. In other words, when there is a boundary between the high-concentration phase and the low-concentration phase in the Y mapping image within the boundaries between the crystal particles after binarization processing, it means that two or more different phases are confirmed in one crystal particle. Further, when the presence of two or more different phases in one crystal particle is confirmed, it is determined that a mixed phase particle is present. On the other hand, when the presence of two or more different phases in one crystal particle is not confirmed, it is determined that a mixed phase particle is not present.

(Presence Rate of Low-Concentration Phases Present in Mixed Phase Particles)

In addition to the determination of the mixed phase particles, the determination of crystal particles comprised of the low-concentration phases is performed by the Y mapping mentioned above. The crystal particles comprised of the low-concentration phases are crystal particles comprised of a single phase having a Y concentration of less than 4.7 mol %, and therefore they can be determined by the SEM/EDX analysis mentioned above. Further, the single phase here means that it is not a mixed phase such as a phase structure in the mixed phase particle mentioned above.

Next, regarding a mapping image of a Y element in a predetermined region (specifically, a region surrounded by 4.5 µm×6 µm) obtained by the SEM/EDX analysis, particle size of crystal particles comprised of the low-concentration phases included in the image was measured. As mentioned above, particle size was measured as an arithmetic mean of the lengths of two sides being in a perpendicular relationship in a rectangle surrounding the crystal particles. The volume of the crystal particles comprised of the low-concentration phases in the predetermined region mentioned above was calculated by taking the cube of the particle size of each crystal particle. Further, the total volume V1 of all the crystal particles comprised of the low-concentration phases in the predetermined region was calculated. The total volume V1 does not include the volume of the mixed phase particles, and naturally does not include the volume of crystal particles comprised of the high-concentration phases.

On the other hand, regarding the same mapping image, the particle size of the low-concentration phases present in the mixed phase particles included in the image was measured. The method of measuring the particle size is as mentioned above. In other words, for a rectangle surrounding the maximum widths of the low-concentration phases in the mixed phase particles in the horizontal direction and in the vertical direction, the arithmetic mean value of the length in the horizontal direction and the length in the vertical direction of the rectangle is the particle size. The volume of the low-concentration phases in the mixed phase particles in the predetermined region mentioned above was calculated by taking the cube of the particle diameter of each low-concentration phase in the mixed phase particles. Further, the total volume V2 of the low-concentration phases in all the mixed phase particles in the predetermined region was calculated. The total volume V2 does not include the volume of the low-concentration phases not included in the mixed phase particles, that is, the volume of the crystal particles comprised of the low-concentration phases, and naturally does not include the volume of the crystal particles comprised of the high-concentration phases.

The presence rate of the low-concentration phases present in the mixed phase particles is an arithmetic mean value obtained by finding the value of V3 calculated from the following formula (1) for the five regions mentioned above. The results are shown in Table 1. Further, in the SEM/EDX analysis, the M phase and the T phase cannot be differentiated, but the high-concentration phase and the low-concentration phase can be differentiated by the Y concentration, and therefore measurement of the presence rate of the low-concentration phases mentioned above can be sufficiently performed. The presence rate of the low-concentration phases present in the mixed phase particles represents the presence rate of the low-concentration phases present in the mixed phase particles among the low-concentration phases present in the partially stabilized zirconia.

$$V3 = 100 \times V2/(V1+V2) \quad (1)$$

(Presence Rate of Adequate Low-Concentration Mixed Particles)

First, the adequate low-concentration mixed particles were determined. The adequate low-concentration mixed particles are mixed phase particles in which the ratio of the low-concentration phases in the particles, that is, the ratio of the phases having a Y concentration of 4.7 mol % or less is 80 volume percent or less. For all the mixed phase particles included in the mapping image mentioned above, the volume percent of the low-concentration phase in the mixed phase particles was calculated for each particle. The ratio V6 of the low-concentration phases in the mixed phase particles is calculated from the following equation (3) from the volume V4 of the mixed phase particles and the volume V5 of the low-concentration phases in the mixed phase particles. by the method mentioned above, the particle size of the mixed phase particles are measured, the volume V4 of the mixed phase particles is calculated by taking the cube of the particle size. The volume V5 of the low-concentration phases in the mixed phase particles is measured and calculated by the method mentioned above. The mixed phase particles in which the ratio V6 of the low-concentration phases is 80 volume percent or less are the adequate low-concentration mixed particles.

$$V6=100\times V5/V4 \quad (2)$$

Next, the particle size of the adequate low-concentration mixed particles included in the image of the predetermined region mentioned above was measured. As mentioned above, the measurement of the particle size is an arithmetic mean of the lengths of two sides being in a perpendicular relationship in a rectangle surrounding the particles. The volume of the adequate low-concentration mixed particles was calculated by taking the cube of the particle size of each particle. Further, the total volume V7 of all the adequate low-concentration mixed particles in the predetermined region was calculated. On the other hand, the total volume V8 of the mixed phase particles in the same region is calculated from the sum of the volume V4 of each of the mixed phase particles.

The presence rate of the low-concentration phase adequate amount mixed phase particle is an arithmetic mean value of V9 values calculated from the following formula (3) for the five regions mentioned above. The results are shown in Table 1. Further, in the SEM/EDX analysis, the M phase and the T phase cannot be differentiated, but the high-concentration phase and the low-concentration phase can be differentiated by the Y concentration, and therefore, the presence rate of the adequate low-concentration mixed particles can be estimated.

$$V9=100\times V7/V8 \quad (3)$$

(Average Particle Size of Mixed Phase Particles)

The average particle size of the mixed phase particles was measured and calculated by the method mentioned above. The results are shown in Table 1.

(Initial Strength)

A measurement sample having a width of 5 mm, a length of 45 mm, and a thickness of 5 mm was cut out from each sample. From this measurement sample, a strength evaluation sample was prepared according to a four-point bending strength test described in JIS R1601: 2008. Next, a four-point bending strength test was performed in accordance with JIS R1601: 2008. The result is set as the initial strength. Meanwhile, the test was performed 10 times for each sample. Table 1 shows the average values. The initial strength is preferably 350 MPa or more.

(Strength after Performing Cooling and Heating Cycles)

A measurement sample similar to the initial strength was cut out from each sample. Next, cooling and heating cycles from room temperature (specifically 25° C.) to 1,100° C. were applied to the measurement sample. The cooling and heating cycles were repeated 1,000 times. The temperature increase rate and the temperature decrease rate in the cooling and heating cycles are both 300° C./h. The strength of each sample after applying the cooling and heating cycles was measured by the method mentioned above. The results are the strength after performing the cooling and heating cycle test. Meanwhile, the test was performed 10 times for each sample. Table 1 shows the average values. The strength of the solid electrolyte required after applying the cooling and heating cycles depends on the use, structure and the like, but the strength can be said to be excellent if it exceeds 150 MPa. For example, a solid electrolyte is used for a laminated type sensor element to be described later, the strength of the solid electrolyte after applying the cooling and heating cycles is preferably 200 MPa or more. Moreover, a solid electrolyte is used for a cup-type sensor element to be described later, the strength of the solid electrolyte after applying the cooling and heating cycles is preferably 250 MPa or more.

Moreover, from the perspective of strength desired for a solid electrolyte used in a gas sensor, each sample was determined based on the following criteria. A solid electrolyte showing an initial strength of less than 350 MPa, or a strength after applying the cooling and heating cycles of 200 MPa or less was evaluated as "P" (poor). Moreover, a solid electrolyte showing an initial strength of 350 MPa or more and a strength after applying the cooling and heating cycles of 250 MPa or more was evaluated as "E" (excellent). A solid electrolyte other than the two mentioned above was evaluated as "G" (good). Further, these evaluations are intended to evaluate the aptitude of each solid electrolyte used for a laminated type gas sensor element. "E" means that the solid electrolyte has excellent aptitude, and "G" shows that the solid electrolyte has good aptitude. "P" merely means that aptitude is not preferable.

TABLE 1

| Sample No. | Presence or absence of mixed phase particles | presence rate of low-concentration phases present in mixed phase particles (volume base) | presence rate of adequate low-concentration mixed particles (volume base) | Average particle size of mixed phase particles (volume base) | Strength after cooling and heating cycles (MPa) | Initial strength (MPa) | Decision |
|---|---|---|---|---|---|---|---|
| 1 | Absent | — | — | — | 150 | 350 | P |
| 2 | Present | 15% | 81% | 1.8 | 200 | 380 | G |
| 3 | Present | 32% | 80% | 1.6 | 210 | 390 | G |
| 4 | Present | 44% | 78% | 1.7 | 220 | 400 | G |
| 5 | Present | 61% | 80% | 1.6 | 220 | 410 | G |
| 6 | Present | 82% | 82% | 1.7 | 230 | 420 | G |
| 7 | Present | 100% | 80% | 1.8 | 240 | 430 | G |
| 8 | Present | 10% | 81% | 1.7 | 180 | 360 | P |
| 9 | Present | 60% | 90% | 1.8 | 270 | 420 | E |
| 10 | Present | 61% | 100% | 1.6 | 290 | 430 | E |
| 11 | Present | 60% | 91% | 0.3 | 300 | 470 | E |
| 12 | Present | 61% | 90% | 0.9 | 270 | 420 | E |
| 13 | Present | 61% | 90% | 1.5 | 250 | 390 | E |
| 14 | Present | 60% | 89% | 2.1 | 220 | 350 | G |
| 15 | Present | 60% | 90% | 2.7 | 180 | 310 | P |

As can be seen from Table 1, Samples 2 to 16 having mixed phase particles show improved strength after applying the cooling and heating cycles compared to Sample 1 having no mixed phase particles. That is, a solid electrolyte having mixed phase particles excels in strength against the cooling and heating cycles.

Figure 7:
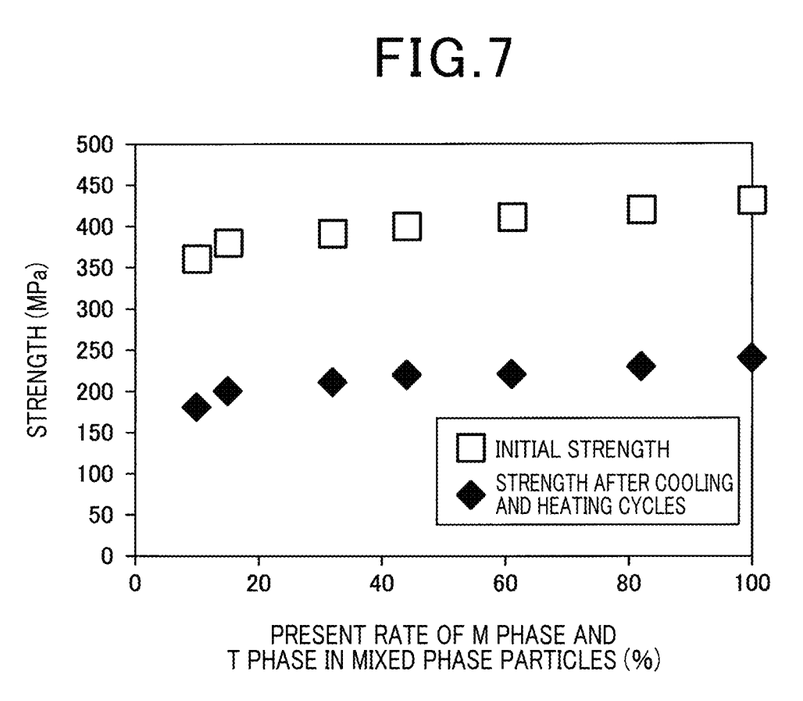
FIG. 7 is a graph showing the relationship between ratio of low-concentration phases present in mixed phase particles to all low-concentration phases, and strength in the Experimental Example.

As can be seen from the comparisons in Samples 2 to 8 in Table 1 and FIG. 7, when the ratio of the low-concentration phases present in the mixed phase particles among the low-concentration phases present in the partially stabilized zirconia is 15 volume percent or more, the strength after applying the cooling and heating cycles and the initial strength are further improved. Moreover, also when the presence rate of the adequate low-concentration mixed particles is 90 volume percent or more, the strength after applying the cooling and heating cycles and the initial strength are further improved. Further, as can be known by comparing Samples 11 to 15, even when the average particle size of the mixed phase particles is from 0.3 to 1.5 µm, the strength after applying the cooling and heating cycles and the initial strength are further improved.

Second Embodiment

Next, an embodiment of a gas sensor 5 using a solid electrolyte shall be described. Meanwhile, of the reference signs used in the second embodiment onward, the same reference signs as those used in the already mentioned embodiments represent the same components and the like as those in the already mentioned embodiments unless otherwise indicated.

Figure 8:
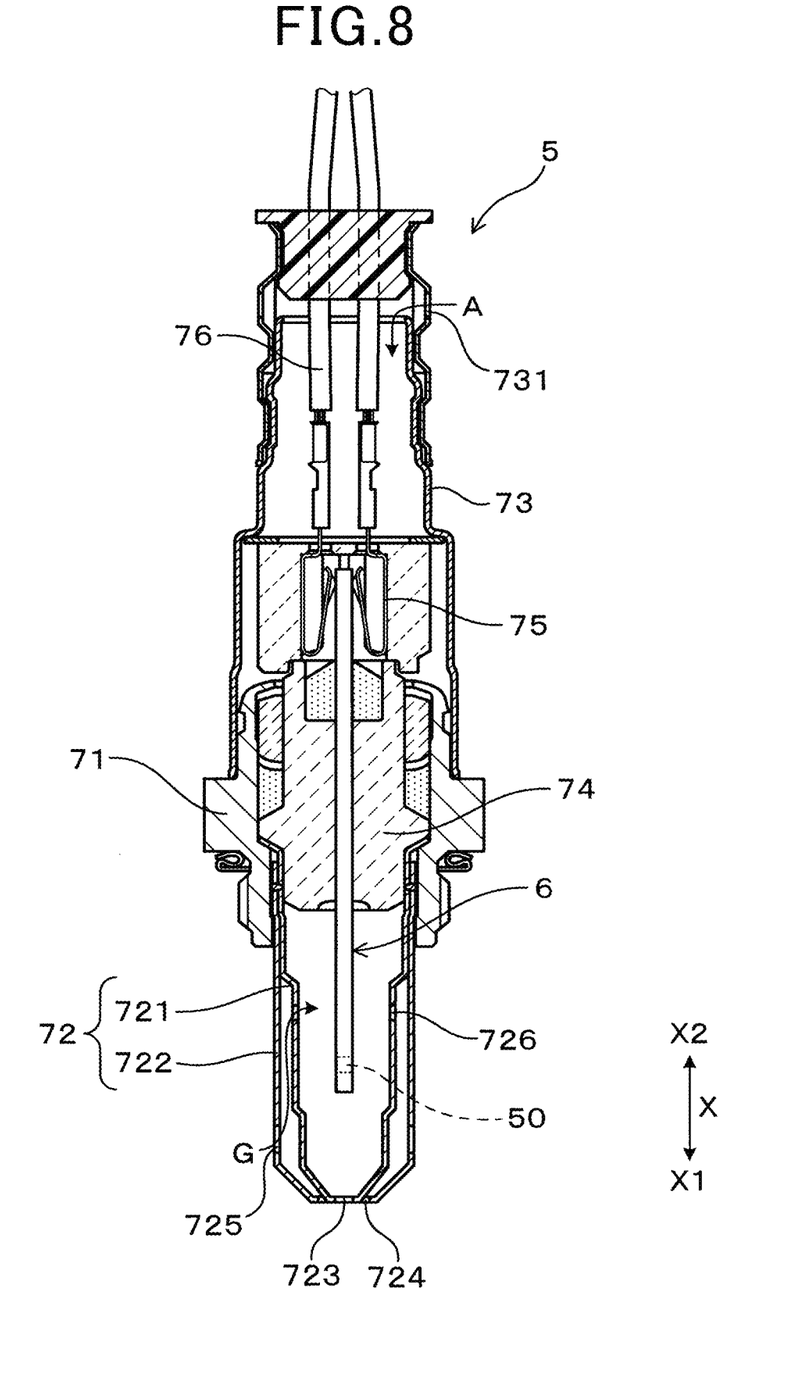
FIG. 8 is a cross-sectional view of a gas sensor in a second embodiment.
Figure 9:
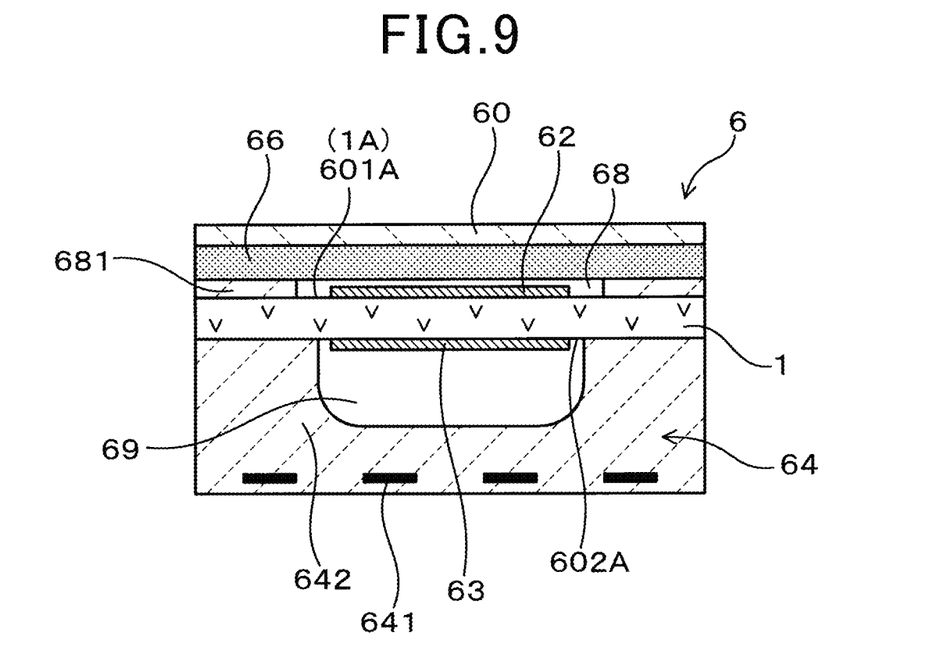
FIG. 9 is a cross-sectional view of a laminated type gas sensor element in the embodiment.

The gas sensor 5 of the present embodiment includes a sensor element 6 as shown in FIG. 8 and FIG. 9. The sensor element 6 of the present embodiment is a gas sensor element that detects gas. The sensor element 6 has the solid electrolyte 1, a detection electrode 62, a reference electrode 63, and a diffusion resistance layer 66. That is, the gas sensor 5 includes the solid electrolyte 1 inside the sensor element 6. The detection electrode 62 and the reference electrode 63 are formed on respective surfaces 601A and 602A of the solid electrolyte 1. The detection electrode 62 and the reference electrode 63 form a pair of electrodes formed at positions facing each other. The diffusion resistance layer 66 limits the flow rate of measurement gas such as an exhaust gas G that reaches the detection electrode 62. The gas sensor 5 is of a limiting current type that detects the oxygen concentration (that is, the air-fuel ratio) of the exhaust gas G based on the magnitude of a limiting current generated between the electrodes 62 and 63 in a state where a voltage is applied between the pair of electrodes 62 and 63.

The gas sensor 5 of the present embodiment shall hereinafter be described in detail. Meanwhile, in the following description, the side of the gas sensor 5 exposed to a measurement gas such as the exhaust gas G in the axial direction X is referred to as a tip side X1, and the opposite side of the gas sensor 5 is referred to as a base end side X2.
(Gas Sensor)

The gas sensor 5 is arranged on an exhaust pipe of an internal combustion engine of a vehicle and the like for use. The gas sensor 5 of a limiting current type of the present embodiment is used as an air-fuel ratio sensor that quantitatively detects the air-fuel ratio of the exhaust gas G flowing through the exhaust pipe. The gas sensor 5 can quantitatively obtain the air-fuel ratio in both cases where the air-fuel ratio of the exhaust gas G is on a rich side and on a lean side.

Here, the air-fuel ratio of the exhaust gas G refers to a mixing ratio of fuel to air when burned in the internal combustion engine. Moreover, the rich side means that the air-fuel ratio of the exhaust gas G is on the side where there is more fuel than the theoretical air-fuel ratio when the fuel and air are completely combusted. The lean side means that the air-fuel ratio of the exhaust gas G is on the side where there is less fuel than the theoretical air-fuel ratio.

In the gas sensor 5 of the present embodiment, the air-fuel ratio of the exhaust gas is detected by detecting the oxygen concentration of the exhaust gas. The gas sensor 5 as an air-fuel ratio sensor substantially detects the oxygen concentration of the exhaust gas G on the lean side, and detects the unburned gas concentration of the exhaust gas G on the rich side.

As shown in FIG. 8, the gas sensor 5 includes a housing 71, a tip side cover 72, a base end side cover 73 and the like in addition to the sensor element 6. The housing 71 is attached to the exhaust pipe and holds the sensor element 6 via an insulator 74. The tip side cover 72 is attached to the tip side X1 of the housing 71 and covers the sensor element 6. The tip side cover 72 has a double structure, and is comprised of an inner cover 721 and an outer cover 722. The base end side cover 73 is attached to the base end side X2 of the housing 71, and covers a terminal 75 for electric wiring of the sensor element 6 and the like.
(Sensor Element)

As illustrated in FIG. 9, a laminated type sensor element, for example, is used as the sensor element 6. That is, the sensor element 6 can be configured by a laminate in which the reference electrode 63, the plate-shaped solid electrolyte 1, and the detection electrode 62 are sequentially laminated.

As illustrated in FIG. 9, the sensor element 6 has, for example, a plate-shaped solid electrolyte 1. The solid electrolyte 1 has a measurement gas surface 601A and a reference gas surface 602A. The measurement gas surface 601A is a surface exposed to a measurement gas such as the exhaust gas G, and serves as a gas contact portion 1A that comes into contact with the measurement gas. On the other hand, the reference gas surface 602A is a surface exposed to a reference gas such as the atmosphere A. The measurement gas surface 601A and the reference gas surface 602A are surfaces opposite to each other in the solid electrolyte 1.

The detection electrode 62 is provided on the measurement gas surface 601A of the solid electrolyte 1. On the other hand, the reference electrode 63 is provided on the reference gas surface 602A. When the sensor element 6 is comprised of such a laminated type sensor element, a heating element 641 constituting a heater 64 is laminated on the solid electrolyte 1 via an insulator 642. The insulator 642 is made of, for example, alumina.

The detection electrode 62 faces a measurement gas chamber 68. Measurement gas is introduced into the measurement gas chamber 68 via the porous diffusion resistance layer 66. The measurement gas chamber 68 is a space surrounded by the solid electrolyte 1, a measurement gas chamber forming layer 681, and the diffusion resistance layer 66. The detection electrode 62 is formed in contact with the solid electrolyte 1, and the measurement gas chamber forming layer 681 that is a structural member of the measurement gas chamber 68 is formed in contact with the solid electrolyte 1. The detection electrode 62 is exposed to a measurement gas such as the exhaust gas G, and is a part that performs gas detection together with the reference electrode 63. The detection electrode 62 is electrically connected to the terminal 75 to which a lead wire 76 is connected.

The reference electrode 63 faces a reference gas chamber 69. A reference gas such as the atmospheric air A is introduced from the base end side X2 into the reference gas chamber 69 via a passage hole 731 of the base end side cover 73. Meanwhile, a cup-type sensor element to be described later can be used instead of the laminated type sensor element as the sensor element 6.

The detection electrode 62 is exposed to a measurement gas such as the exhaust gas G that flows into the tip side cover 42 through passage holes 723, 724, and 725 provided in the tip side cover 72. The reference electrode 63 is exposed to a reference gas such as atmospheric air A that flows from the inside of the base end side cover 73 into the reference gas chamber 69 of the solid electrolyte 1 through the passage hole 731 provided in the base end side cover 73.

The heater 64 generates heat by energizing, and heats the solid electrolyte 1 and the electrodes 62 and 63 to an activation temperature at the start of the internal combustion engine and the gas sensor 5 and the like. The heater 64 is comprised of the insulator 642 made of an alumina sintered body and the heating element 641 formed therein. The alumina sintered body constituting the insulator 642 is in contact with the solid electrolyte. The insulator 642 constituting the heater 64 is also a structural member forming the reference gas chamber 69, and also plays a role as the reference gas chamber forming layer.

Moreover, in the solid electrolyte 1, the measurement gas chamber forming layer 681 constituting the measurement gas chamber 68 is laminated on the side of the measurement gas surface 601A. The measurement gas chamber forming layer 681 is made of alumina. That is, the solid electrolyte 1 is in contact with the insulator 642 constituting the heater 64 mentioned above on the side of the reference gas surface 602A, and is in contact with the measurement gas chamber forming layer 681 on the side of the measurement gas surface 601A.

The diffusion resistance layer 66 is comprised of, for example, a spinel porous body. Moreover, a shielding layer 60 made of alumina is provided on the surface of the diffusion resistance layer 66. The shielding layer 60 is made of a dense body that does not transmit gas. The exhaust gas G that flowed into the tip side cover 72 passes through the diffusion resistance layer 66 and reaches a measurement unit 50 of the detection electrode 62. In the constitution of the sensor element 6 illustrated in FIG. 9, the diffusion resistance layer 66 is not in contact with the solid electrolyte 1, but it is possible to adopt a constitution in which the diffusion resistance layer 66 is in contact with the solid electrolyte 1.

(Solid Electrolyte)

The solid electrolyte 1 is comprised of the partially stabilized zirconia 2. Specifically, the solid electrolyte described in the first embodiment is used. The solid electrolyte 1 excels in strength against the cooling and heating cycles, and retains high strength against the cooling and heating cycles exposed to a high temperature region, for example, temperatures exceeding 1,000° C. Therefore, even if the gas sensor 5 is applied for use, for example, at temperatures exceeding 1,000° C., the gas sensor 5 can detect a measurement gas while retaining high reliability.

(Electrodes)

The material of the detection electrode 62 of the present embodiment is not particularly limited as long as it has catalytic activity to oxygen and the like. For example, the detection electrode 62 may include any composition of Pt (platinum), Au (gold), Ag (silver), a mixture or alloy of Pd (palladium) and Ag, and a mixture or alloy of Pt and Au as noble metal components. Moreover, the material of the reference electrode 63 is not particularly limited, and Pt (platinum), Au, Ag, Pd and the like can be included as noble metal components.

Figure 10:
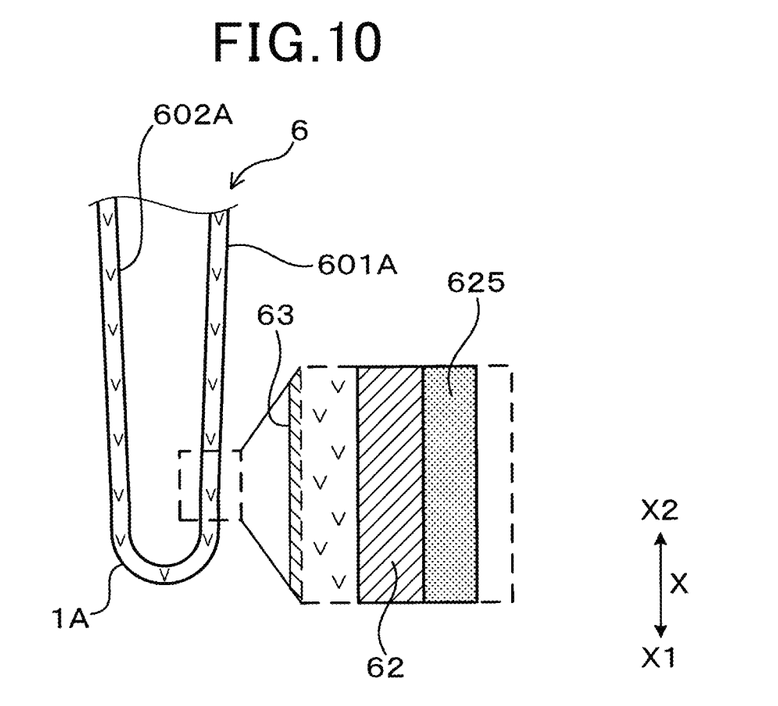
FIG. 10 is an explanatory view of a cross section of a cup-type gas sensor element in Embodiment 2.

Moreover, as illustrated in FIG. 10, a bottomed cylindrical type (specifically, a cup-type) sensor element, for example, can be used as the sensor element 6, instead of the laminated type sensor element. Such a cup-type sensor element has the solid electrolyte 1 having a bottomed cylindrical shape (specifically, a cup shape), the detection electrode 62, and the reference electrode 63. The detection electrode 62 is provided on the outer peripheral surface 601A of the solid electrolyte 1. The reference electrode 63 is provided on the inner peripheral surface 602A of the solid electrolyte 1. In such a cup-type sensor element, a rod heater (not shown in the drawings) is inserted into the inside of the sensor element 6. The heater heats the sensor element 6 to a desired temperature.

The detection electrode 62 is provided on the outer peripheral surface 601 A of the solid electrolyte 1. Further, a porous protective layer 625 is formed on the outer peripheral surface 601A of the solid electrolyte. In FIG. 10, the protective layer 625 is a porous body, and is comprised of, for example, spinel. Meanwhile, in the illustration of FIG. 10, the detection electrode 62 is present between the protective layer 625 and the solid electrolyte 1, but the detection electrode 62 is not necessarily formed on the entire outer peripheral surface 601A, and a non-formation part is usually present. Therefore, although not shown in the drawings of the configuration, a portion in which the protective layer 625 contacts the solid electrolyte 1 is present. The outer peripheral surface 601 on the tip side X1 of the solid electrolyte 1 is a contact portion 1A that comes into contact with a measurement gas such as an exhaust gas G.

Moreover, a reference electrode 63 is provided on the inner peripheral surface of the cup-type solid electrolyte 1, but the reference electrode 63 may be provided on the entire inner peripheral surface or on a portion thereof. When provided on a portion thereof, alumina composing a heater may contact the solid electrolyte.

Similarly to the case of the laminated type sensor element, strength against the cooling and heating cycles improves also in the cup-type sensor element by using the solid electrolyte 1 in the first embodiment. Therefore, even in the gas sensor 5 including the cup-type sensor element, the gas sensor 5 can detect the measurement gas while maintaining high reliability.

The present disclosure is not limited to each of the embodiments mentioned above, and can be applied to various embodiments in a scope not departing from the substance thereof. That is, although the present disclosure has been described based on the embodiments, the present disclosure should be understood not to be limited to the embodiments, structure, and the like. The present disclosure includes various modified examples and modifications within the equivalent scope. In addition, various combinations and configurations, as well as other combinations and configurations including only one element, or more than or less than one element, are within the scope and spirit of the present disclosure. For example, the solid electrolyte in the first embodiment can also be used for a solid oxide fuel cell (SOFC). In this case, the solid electrolyte has a contact surface with, for example, an anode layer and a cathode layer. Although not shown in the drawings of the configuration, it is possible to apply the solid electrolyte to a fuel cell unit cell where an anode layer, an electrolyte layer comprised of a solid electrolyte, and a cathode layer are sequentially laminated. Furthermore, a stacked type fuel cell can be constructed by laminating a plurality of fuel cell unit cells via a separator. Moreover, as for gas sensors, there are an oxygen sensor, NOx sensor and the like besides an air fuel ratio sensor, and it is possible apply the solid electrolyte to these sensors.

What is claimed is:

1. A solid electrolyte comprising a partially stabilized zirconia that is comprised of zirconia and a stabilizer being in a solid solution in the zirconia;
wherein:
the partially stabilized zirconia comprises crystal particles,
the crystal particles include mixed phase particles each having a high-concentration phase and a low-concentration phase;
the high-concentration phase is defined such that a concentration of the stabilizer is 4.7 mol % or more;
the low-concentration phase is defined as a concentration of the stabilizer is less than 4.7 mol %;
the mixed phase particles contain 15 volume percent or more of a total of the low-concentration phases in the partially stabilized zirconia;
the mixed phase particles include adequate low-concentration mixed particles each containing 80 volume percent or less of the corresponding low-concentration phase;
a presence rate of the adequate low-concentration mixed particles to all the mixed phase particles is set to 90 volume percent or more; and
the average particle size of the mixed phase particles is from 0.3 to 1.5 µm.

2. The solid electrolyte according to claim 1, wherein the stabilizer is comprised of yttria.

3. A gas sensor comprising a solid electrolyte according to claim 1.

4. A method of producing the solid electrolyte according to claim 1, the method comprising:
a heat treating step of mixing and heat treating a first raw material powder comprised of zirconia particles and a stabilizer raw material powder comprised of stabilizer particles to thereby prepare a mixed raw material comprised of bonded particles, each of the bonded particles being comprised of at least one of the zirconia particles and at least one of the stabilizer particles that are bonded to each other;
a mixing step of mixing the mixed raw material, and a second raw material powder comprised of zirconia particles to thereby obtain a mixture;
a shaping step of shaping the mixture into a predetermined shaped body; and
a firing step of firing the predetermined shaped body to obtain the solid electrolyte comprised of the partially stabilized zirconia.

5. The method of producing a solid electrolyte according to claim 4, wherein the first raw material powder is comprised of the zirconia particles having a larger average particle size than an average particle size of the zirconia particles of the second raw material powder.

6. A method of producing the solid electrolyte according to claim 2, the method comprising:
a heat treating step of mixing and heat treating a first raw material powder comprised of zirconia particles and a stabilizer raw material powder comprised of stabilizer particles to thereby prepare a mixed raw material comprised of bonded particles, each of the bonded particles being comprised of at least one of the zirconia particles and at least one of the stabilizer particles that are bonded to each other;
a mixing step of mixing the mixed raw material, and a second raw material powder comprised of zirconia particles to thereby obtain a mixture;
a shaping step of shaping the mixture into a predetermined shaped body; and
a firing step of firing the predetermined shaped body to obtain the solid electrolyte comprised of the partially stabilized zirconia.

7. The method of producing a solid electrolyte according to claim 6, wherein the first raw material powder is comprised of the zirconia particles having a larger average particle size than an average particle size of the zirconia particles of the second raw material powder.

* * * * *